United States Patent
Schmitt

(10) Patent No.: US 7,886,360 B2
(45) Date of Patent: Feb. 8, 2011

(54) SECURITY DEVICE FOR DATA CARRIERS

(75) Inventor: Peter Schmitt, Wurzburg (DE)

(73) Assignee: KBA-Metronic AG, Veitshochheim (DE)

( * ) Notice: Subject to any disclaimer, the term of this patent is extended or adjusted under 35 U.S.C. 154(b) by 951 days.

(21) Appl. No.: 11/051,370

(22) Filed: Feb. 4, 2005

(65) Prior Publication Data

US 2005/0172150 A1    Aug. 4, 2005

(30) Foreign Application Priority Data

Feb. 4, 2004    (DE) .................. 10 2004 005 654

(51) Int. Cl.
*H04L 9/00*    (2006.01)
(52) U.S. Cl. ....................................... 726/26
(58) Field of Classification Search .................. 726/26, 726/27, 30, 31, 32, 33; 713/172, 185; 380/201, 380/202; 369/53.11, 64
See application file for complete search history.

(56) References Cited

U.S. PATENT DOCUMENTS

| | | |
|---|---|---|
| 5,790,489 A | 8/1998 | O'Connor |
| 6,118,426 A | 9/2000 | Albert et al. |
| RE39,653 E * | 5/2007 | Oshima et al. .............. 726/26 |
| 7,315,946 B1 * | 1/2008 | Blumenfeld et al. ......... 713/175 |
| 2002/0027390 A1 * | 3/2002 | Ichiki et al. ................. 307/117 |
| 2004/0223198 A1 * | 11/2004 | Murray et al. ................. 359/1 |

FOREIGN PATENT DOCUMENTS

| | | |
|---|---|---|
| DE | 19616819 | 10/1997 |
| DE | 199 07 969 | 8/2000 |
| DE | 100 32 604 | 1/2002 |
| DE | 10032604 | 1/2002 |
| DE | 100 35 598 | 2/2002 |
| DE | 101 55 832 | 5/2003 |
| WO | 99/38162 | 7/1999 |
| WO | 02/17316 | 2/2002 |
| WO | 02/075645 | 9/2002 |

OTHER PUBLICATIONS

German Search Report, May 10, 2004.
German Search Report dated Dec. 7, 2007.
* cited by examiner

*Primary Examiner*—Beemnet W Dada
(74) *Attorney, Agent, or Firm*—Chadbourne & Parke LLP; Walter G. Hanchuk

(57) ABSTRACT

The invention relates to a security device for data carriers which may be or is secured onto or within a data carrier or its housing, and in which data may be exchanged, especially bidirectionally, with the security device, by means of a read/write device especially provided for the data carrier. The invention furthermore relates to a data carrier, especially optical data carriers with such a security device, as well as a process for securing data carriers against unauthorized copying, wherein data recorded on an electronic security device installed upon or in a data carrier, are processed by the security device and the outcome of such processing is read out from the security device.

12 Claims, 3 Drawing Sheets

SECURITY DEVICE FOR DATA CARRIERS

BACKGROUND OF THE INVENTION

The invention relates to a security device for data carriers. Data carriers, notably optical data carriers, find application in many areas of industry and everyday living. Thus, for example, Compact Discs (CD's) or Digital Versatile Discs (DVD's) are used to store software, data, music and films in compressed or uncompressed form.

What is advantageous in this type of data carriers is their ability to store a large volume of data, their economical production costs and long life.

Nevertheless, a big problem for the industry is the growing number of unauthorized copies, produced and marketed by ever more professionally operating hackers. For this reason, even today a number of different protective mechanisms are already in use with the aim of preventing or at least making copying more difficult.

BRIEF SUMMARY OF THE INVENTION

At the same time, copying facilities and copy-making software is getting better all the time, so that copy protection on a data carrier stays functional for a short time only, or can actually be circumvented right from its launching with suitable, often commercially available programs, allowing for unauthorized duplication of the data carrier.

The way many of these safety mechanisms work is that in certain data carrier areas blocked to normal access, data may be stored that are accessible to a secure query.

Data carriers equipped with such a feature for a secure scan may be produced in much the same way as conventional data carriers, so that production costs remain the same. The drawback is that a number of copying programs are also already capable of accessing these areas, thereby obviating or actually duplicating the copying protection. In this latter case, a copy can no longer be differentiated from the original in terms of its data content.

It is also known in data carriers as for example CD's or DVD's that the readout of security-relevant data takes place from protected areas, whereby this can be accomplished during the normal operation of the program to be protected. By special software routines circumventing the normal access restrictions of the read/write equipment, it is possible for example to detect once or repeatedly during a program cycle the presence of the original data carrier, for example a CD.

The drawback of such processes is that such a protection is relatively easy to bypass in that a hacker merely needs to remove, bypass or replace the software portion responsible for the scan of the data stored on the data carrier. In such a case, the conventionally copied program is so altered that no verification takes place any longer.

The task of the invention is to make available a security device for data carriers which makes it possible to alter or expand an otherwise substantially unchanged data carrier, as for example an optical data carrier, in such a way as to afford greater copying protection. Beyond that, it is the task of the invention to make available in conjunction with such a security device a data carrier which can be economically produced with conventional production processes and whose protective mechanism is difficult to circumvent, if at all, thanks to the security device.

According to the invention, this task is solved in that the security device for data carriers may be attached, or is attached, onto or within a data carrier or its housing, and that data are exchangeable with the security device, in particular bidirectionally, with the aid of a read/write device especially provided for the data carrier.

According to the invention, provision may be made for conventional already existing data carriers to be already in the production process outfitted with the security device according to the invention or that such a security device be subsequently mounted onto existing data carriers or their housing, whereby provision may be especially made for a suitable recess.

According to the invention, it is therefore contemplated that the data carrier and the security device constitute two basically different physical units which may be connected with each other or are already connected in the production cycle. In this respect, the data carrier and the security device—which on its part may also be designated as a carrier of data, to wit, security-relevant data—differ in particular in terms of the type of data storage and/or processing.

Thus, for example in relation to conventional optical data carriers, such as CD's and DVD's, it is possible with appropriate read/write equipment, as for example the so-called burners, to effect a manipulation, for example a recording of the data carriers, but it is not possible to also manipulate with these read/write devices the security-relevant tags of the security device included on or within the data carrier in such a way as to make feasible especially a physical copying of the security device and or the tags included therein. True, a hacker might accordingly copy in principle the data content and/or the software of the optical data carrier, but there is no possibility to copy along the security-relevant tags of the security device which is physically separate but bodily connected to the data carrier.

DETAILED DESCRIPTION OF THE INVENTION

Figure 1:
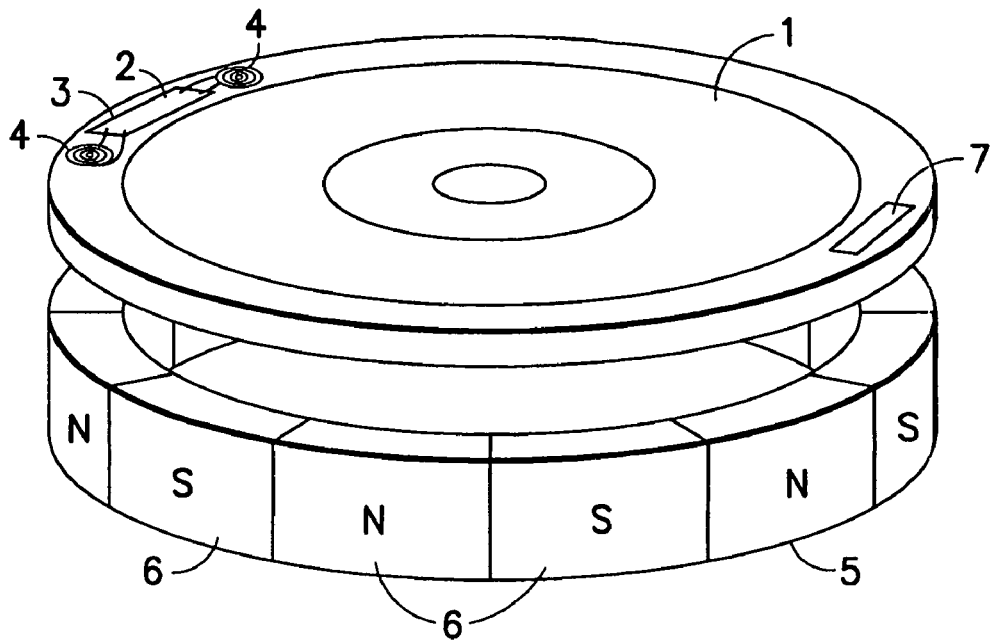
FIG. 1: a data carrier with the security device and magnetic energy transfer.

According to the invention, provision may be made for a security device which may be or is secured on or in a data carrier or its housing and which includes security-relevant tags, as for example electronics and/or data, which may be read out, written or altered with the aid of software running on a computer. As for the software running on the computer, this is preferably the software stored on the data carrier and downloaded therefrom into the computer.

Thus, the software supplied by means of a data carrier conforming with the invention may during its installation and/or running cycle verify whether the data carrier with the security device is mounted in the read/write device and whether the same is the original data carrier.

In order to make possible in particular the bidirectional exchangeability of data with the security device, for example by means of the computer and especially with the read/write device provided for the data carrier, provision is made according to a preferred feature of the invention for the security device to contain, for example, electronics in particular for the storage and/or processing of data.

Thus, for example, a portion of the data supplied with the data carrier may be stored in the security device, so that the totality of the data to be employed represents the sum of those from the data carrier and those from the security device, whereby employable data are only usable through the interplay of the security device and the data carrier.

Similarly provision may be made that along with the storage of security-relevant data or any generally security-relevant features in the security device, available for the read-out and thus for verification, it is also possible to enter into the security device data or tags, for example for the purpose of verifying whether such a security device is on hand.

Similarly provision may be made to enter data and/or tags into the security device, to have such entered data or tags actively processed by the security device and again read out and to verify the result of the processing from the security device, thereby making it possible to authenticate the data carrier. In this manner, data carriers of any given type, for example optical or magnetic data carriers, may be secured against unauthorized copying, inasmuch as a security device of the invented type cannot be copied with conventional read/write equipment used to read and write data from or upon the data carriers.

According to an advantageous embodiment of the invention, provision may be made for the electronics to be supplied with energy, especially on a wireless basis, by means of a read/write device provided for the data carrier. Such energy supply may for example be provided optically and/or inductively, though not limited thereto. In a particularly preferred embodiment, the energy supply may, for example, be performed by means of a laser configuration of a typical read/write device provided for optical data carriers.

To this end, a security apparatus may feature at least one energy transducer which converts light energy into electrical energy, something which is feasible for example with the aid of photocells.

In a further embodiment, provision may be made for the transfer of data between the data carrier and the read-out equipment by means of radio waves. In this case, the read-out equipment for the interactive data exchange with the security element need not necessarily be identical with the read-out equipment of the data carrier, but because of the greater range of radio waves may also be located at a distance away from the read-out unit of the data carrier. This type of data transfer is known from so-called transponder systems. In this embodiment, the already existing read-out equipment for conventional data carriers may to good advantage continue to be used, requiring merely a supplemental transceiver module to communicate with the security apparatus.

In a further preferred configuration, provision may also be made for data transfer from and to the security device to be optical and/or inductive or magnetic, again particularly by means of a laser, as typically included in read/write devices for optical data carriers.

Such a realization of both the data transfer as well as the energy transfer for the security device has the special advantage in that the existing read/write equipment for conventional optical data carriers, including other data carriers, for example those of a magnetic type, may continue to be used purely on the hardware side, requiring merely the use of software to command and operate magnetic or optical read/write units of the conventional read/write devices in such a way as to afford entering data on the security device and/or read-out of data from the security device.

The entry and read-out of data and/or the transfer of energy, especially in rotary data carriers, is particularly simple to realize when the security device is mounted concentrically at a distance about the axis of rotation of the data carrier. In this manner the read/write unit of a conventional read/write device, for example the laser head, may be set at the correct radial distance from the axis of rotation, so that instead of reading and/or writing from the data carrier or onto the data carrier, it can accomplish the corresponding transfer of data from or to the security device, especially where energy is transferred simultaneously in this manner.

Provision may similarly be made for the security device to be mounted on a specific point of a rotary data carrier and to rotate together with it, whereby data transfer from or to the security device is synchronized whenever the security device passes the read/write unit of a conventional read/write device. Here, too, provision may be made for the read/write unit to be set at a predetermined radial distance from the axis of rotation, in order to effect the transfer of data.

Provision may further be made to insert separate units for the transfer of energy and/or data in the read/write devices, especially where the security device is mounted on or within the housing of a data carrier.

In a particularly preferred embodiment of the security device, provision may be made for the same to include electronics and for the electronics to be mounted onto the data carrier by a printing technology process. In this way, it is especially simple to create on a data carrier an electronic security device of particularly thin construction.

Further advantages of such a construction which may be accomplished by printing technology with the aid of polymer electronics include the mechanical flexibility of such circuits and the economy of manufacture during the production process of the data carriers.

For example, this manner of realization makes it possible to mount onto a data carrier polymer electronic circuits which exchange data and information for example over an integrated optical interface to the read/write head of a conventional read/write device, for example the laser unit of a CD or DVD burner or even just one read-out unit.

Thanks to the possibility to incorporate electronics into the security device for example by printing technology, this security device may form an interactive constituent of the data carrier and in particular with the data stored thereon, or of the corresponding software. For example, the security apparatus which may also be incorporated in an area of the data carrier blocked to data, may only be addressed by way of special software routines. Deviating from known processes, this makes it possible not only to read out exclusively unalterable data, but also to enter variable data and/or read out and transfer same to a program running on the computer, following active processing on the data carrier and/or the associated security device.

This may be accomplished for example by the use of an electronic structural group, consisting of active and passive electronic structural elements, which may be for example produced in a known manner in a separate production process.

The shape of the structural group or of the security device may be chosen in such a way as to be transferable in a subsequent process into a recess provided therefore, as for example an opening or recess in the data carrier or its housing.

As previously described in principle, the provision of energy for the electronics may be accomplished by way of integrated elements, converting for example light energy into electric energy, as for example photo cells or solar cells, so that for example a laser beam of a conventional read/write instrument may be utilized for the transfer of energy.

Additionally, provision may be made on the security device and/or the data carrier for energy storage, as for example condensers or batteries, supplying energy to an electronic circuit in the security device during the read/write cycle of the read/write device.

Alternatively, as previously mentioned in principle, the energy interconnection may also be inductive, that is accomplished by way of applied coils, so that for energy input use may also be made in particular of the rotation of optical data carriers. In such a case, it is possible to arrange for example within the read/write unit one or more magnets to achieve energy coupling.

As magnets, for example, it is possible to utilize plastic-encapsulated flexible magnetic foil, with a thickness for example of less than 1 mm, inserted in a suitable location within a conventional read/write unit. Such plastic-encapsulated magnets may be produced in any conceivable shape and may be pre-magnetized in a variety of ways during the production process, so that for example it is feasible to produce a ring-shaped magnetic foil whose magnetic polarity changes along the annular segments, especially on the surface of the ring.

Now, if such a foil is placed concentrically to the position of an optical data carrier, such as a CD or a DVD in the read/write unit, it is possible in the invented data carrier to mount coils in corresponding locations, so that in normal rotation of the data carrier an effective induction is generated in the said coil and thereby a highly efficient power supply of the electronic security device according to the invention.

To this end, the coils may for example be arranged directly within or upon the security device or also spatially removed from it, whereby it is possible to make provision for energy transfer to the security device. To this end, suitable electric conductors may be provided for example on the optical data carrier, and the same may also be mounted thereon for example with printing technology procedures.

As previously stated, for the described data exchange between a read/write device and the invented security device and/or a data carrier outfitted therewith, it is possible to make use of an optical read/write head already available in the read/write device, so that provision may be preferably made for at least one optically active element in the security device, whose reflective properties may be electrically altered. Similarly, provision may be made for at least one photo element in the security device capable of receiving information, for example from a modulated laser beam. Provision may also be made for separate units in the read/write devices for the entry or read-out of the security devices according to the invention.

An electronic security device and/or an electronic structural group incorporated therein may be executed for example as a storage device, computing element etc., in particular as an ROM storage unit for a subsequent one-time recording of individualized information. Such a recording may for example be imparted during the manufacturing process or during the initial start-up or installation at the end user's. Similarly, storage units capable of repeat registration may be installed.

For the realization of the mentioned electronics, provision may be made for example to install in special areas of a data carrier, its surface or its housing, preferably by printing technology processes, organic semiconductor structures, capable of acting as electronic storage units or calculator elements. The installation of such structures may for example take place in several steps, as mentioned hereunder:

An electric conductor prototype in the form of contacts, connectors, or coils may be installed on the data carrier and/or its housing. Between the imprinted electric contacts, which may be preselected in case of need, other electronic components, as for example resistor elements, may be installed. The selected contacts or conductor prototypes may be structured by means of suitable procedures, as for example laser ablations etc., so as to create the requisite micro structures for the production of semiconductor elements, such as for example diodes, transistors, solar cells etc. Semiconductor material can be deposited onto these prefinished micro structure areas. Similarly, isolation layers may be applied onto the semiconductor materials, to afford insulation against further layers. In addition, electric conductor prototypes may be applied by printing techniques for the connection of individual electric contacts within the circuits so created, or to contact the generated semiconductor structures.

The installation of conductor tracks, electronic components such as resistor elements etc., semiconductor and insulation materials may be accomplished as mentioned by suitable printing techniques, as for example flexographic printing, serigraphy, offset printing, photogravure intaglio as well as ink jet printing, electrophotography, ionography or magnetography. In individual cases, even the supplemental structuring may be obviated as for example when the required micro structures may already be created by the chosen printing technique itself.

In another embodiment it may in addition prove advantageous to install along with, or alternatively to the previously described steps, conventional active or passive electronic components on the data carrier and/or to install the already at least partially realized security device. In a case of this nature, the conventional structural parts may be for example conductively linked to selected contacts for example by way of previously mounted electrically conductive adhesives, or in another embodiment by way of conventional soldering.

The network so created from electronic structural parts and connections may constitute an electronic component of the security device and thus become an interactive component of the data stored on the data carrier or of the software.

Similarly, provision can be made for the power supply to be so realized as to construct at least a portion of the mounted circuits, particularly those mounted by printing techniques, as photocells and/or solar cells or as induction loops, in such a way that, as previously described, the energy transfer may take place by means of the laser of a read/write head or by means of additional magnets.

The following figures illustrate various forms of embodiment of the invention:

The numerals shown in the subsequent figures designate:
1 Data carrier
2 Electronic unit
3 Security apparatus
4 Coil
5 Ring
6 Annular segment
7 Equalizer mass
8 Power receiver
9 Optically active film
10 Read/write device
11 Laser
12 Antenna
13 Transmitter and receiver FIG. 1 shows a rotary data carrier 1, for example a CD or DVD, featuring in its external region a security device 3, wherein along with an electronic unit 2 there are one or more coils 4 mounted for example for energy transfer. The security device 3 extends concentrically around the median axis of rotation in the outer marginal area of the data carrier. In order to minimize mechanical imbalances in the operation of the entire data carrier, it is opportune to outfit the security device 3 with one or more equalizer masses 7.

For the transfer of energy, provision may be made for example for the ring 5 illustrated in FIG. 1, whose annular segments 6 possess alternating magnetic polarity.

Such a magnetic ring 5 may be mounted inside a read/write unit, extending essentially concentric to the rotating data carrier 1 and/or its axis of rotation.

By reason of the rotation of data carrier 1, at least one of the coils 4 mounted thereon will successively pass along the regions of varying magnetic polarity of ring 5, so that the alternating magnetic fields will generate in coil 4 induced voltage which can be tapped and utilized for the power supply to security device 3 and in particular for the electronic device 2 mounted therein.

In this embodiment, the reading and writing of data from and to the security device 3 may for example be accomplished with a laser, wherefore the security device 3 features an appropriate photosensitive coating, whereby for example the reflective properties of the surface area of security device 3 may be varied with the aid of the laser beam, so that data may thereby be read or written.

Figure 2:
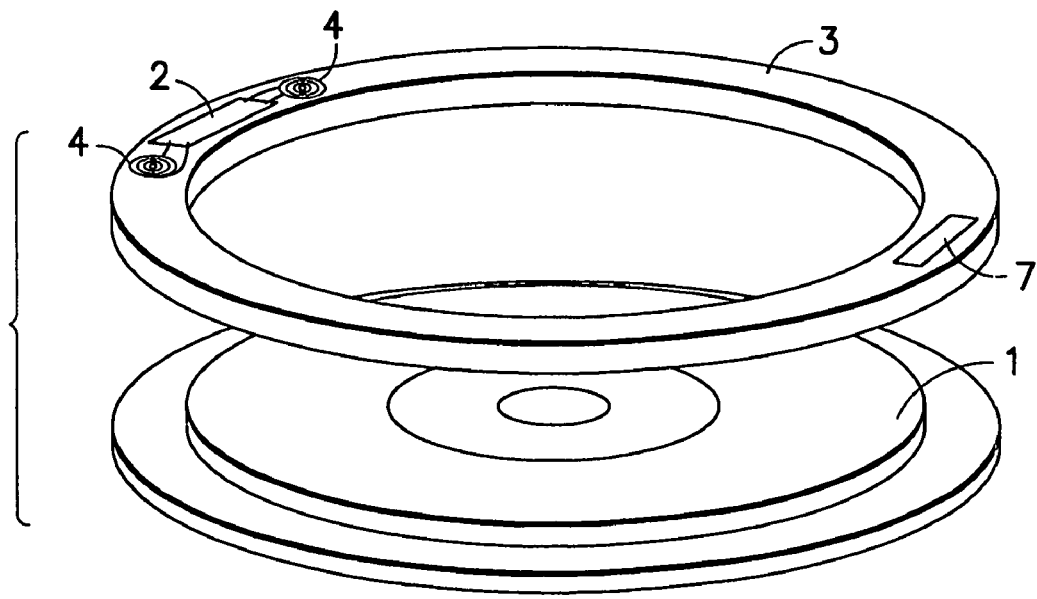
FIG. 2: a data carrier with a recess to take up a security element.

FIG. 2 shows a similar structure in which the security device 3 is also mounted in the outer marginal area of an optical data carrier, for which this data carrier features a recess in the marginal area and/or a marginal area of reduced thickness in which the security device 3 may be inserted. For greater clarity, the data carrier 1 and the security device 3 are shown separately in the illustration of FIG. 2.

Such an insertion may, for example, also take place subsequently. In the manner already described, a data carrier 1, for example an optical data carrier, may be provided subsequently, or it may already be provided during manufacture with an electronically active and variable security tag, whereby the security device 3 allows for example conventional read/write devices to recall and/or alter interactively the security tags and/or data stored therein.

Figure 3:
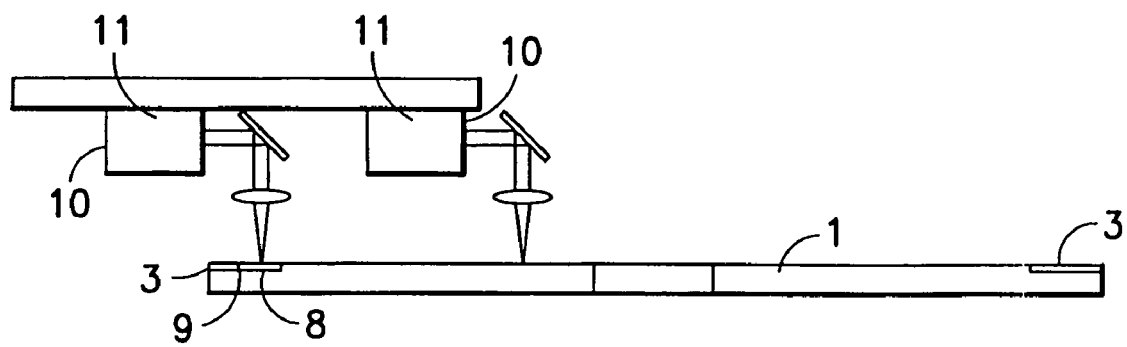
FIG. 3: an arrangement for data transmission and energy transfer in the security apparatus.
Figure 4:
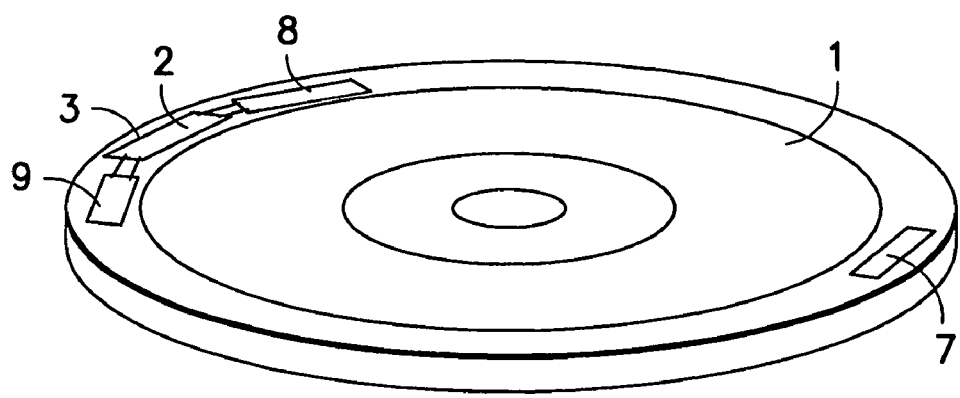
FIG. 4: a data carrier with optical energy transfer and data transmission.

FIGS. 3 and 4 show a structure in which a security device 3 is similarly mounted in the outer marginal region of an optical data carrier 1, whereby the energy transfer in the security device 3 takes place by means of a laser 11 located in the read/write unit 10.

In setting A, the laser 11 operates as a transmitter of energy to an optical power receiver 8 contained in security device 3, for example in the form of a photocell.

Data transmission between the read/write unit 10 and the security device 3 also takes place in Setting A by way of the reading device 10 and an optically active coating 9 in the security device 3. For the transmission of information from the reading unit to the security device, the optically active coating 9 is switched on in a condition enabling the photocell mounted beneath the optically active coating 9 to receive signals transmitted from the reading unit.

For the transmission of information from the security device 3 to the reading unit, the optically active coating 9 is modulated according to the data to be transferred in such a way that two states may be generated for example for the transmission of binary signals, whereby one state features elevated reflexion for the incident laser beam and the other a low reflexion for the incident laser beam. In this way, the same conditions are created as are required for the readout of data in conventional optical data carriers. In Setting B of the reading unit, the data stored in the data carrier may be read out in the customary manner.

Figure 5:
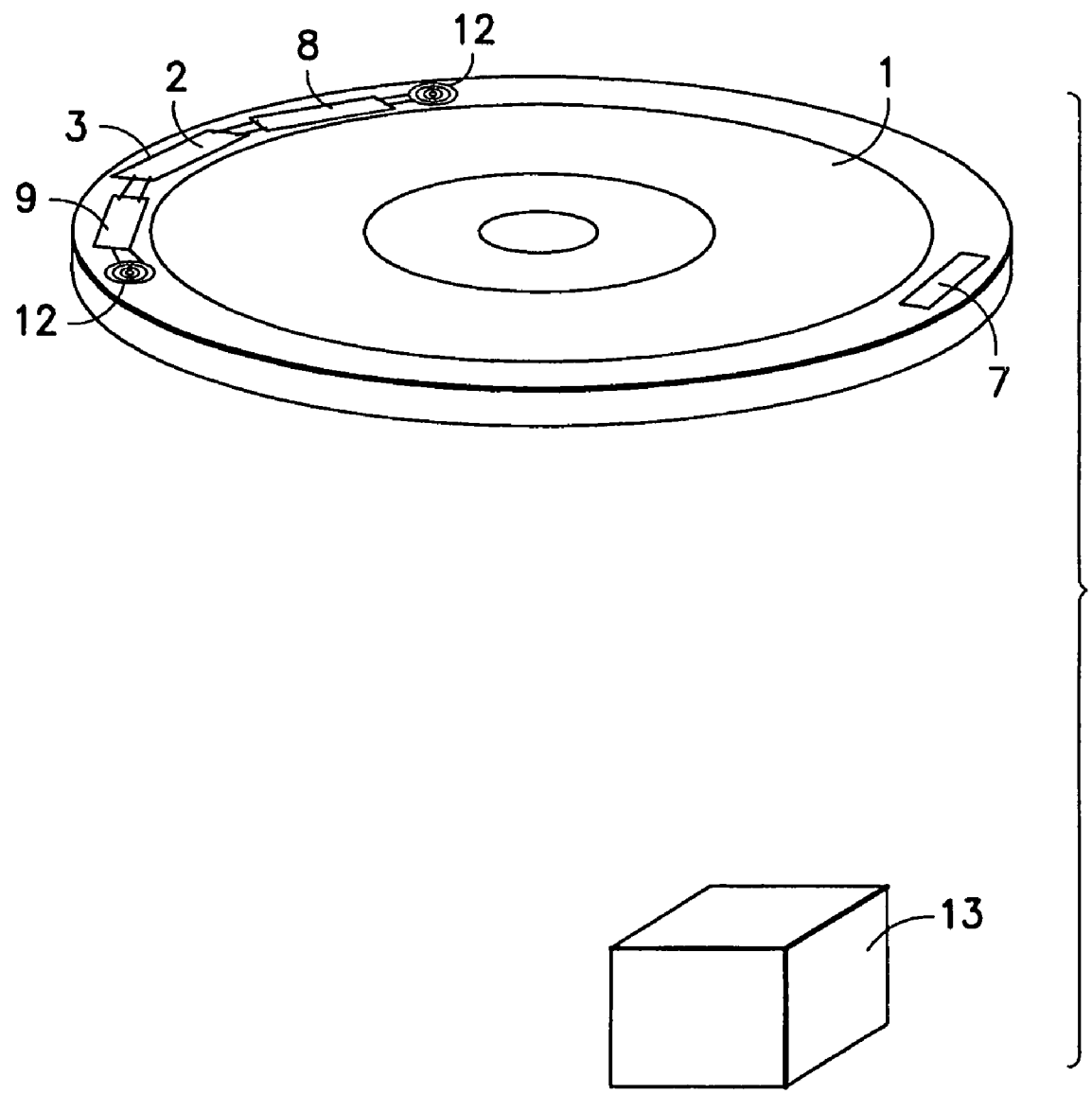
FIG. 5: a data carrier with optical or magnetic energy transfer and optical data transmission or radio data transmission.

FIG. 5 shows another form of execution in which the data transmission between the data carrier and the reading unit is additionally accomplished by means of radio waves. In this case, the electronic device 2 mounted in the security device 3 contains a radio transmitter and a radio receiver. The range of communication may be enhanced by antennas 12 similarly mounted in the security device 3. The sender/receiver unit 13 for the interactive data exchange with the security apparatus may be installed separate from the read/write unit. With a suitable design of the antennas 12, the same may also be utilized, as previously described, for the transfer of energy.

This application claims priority from German application No. 10 2004 005 54.4 filed on Feb. 4, 2004 which is hereby incorporated by reference herein.

The invention claimed is:

1. A security device for a data carrier, comprising:
    a printed flexible polymer electronic circuit having printed electronic components and conductor tracks and securable on or within a data carrier or its housing;
    the security device being configured such that data are exchangeable bidirectionally with the security device by a read/write device provided for the data carrier.

2. The security device according to claim 1, wherein the security device may be mounted onto an existing data carrier or its housing inside a recess on the data carrier.

3. The security device according to claim 1, wherein the security device contains electronics for at least one of storage of data and processing of data.

4. The security device according to claim 3, wherein the electronics receives at least some of its power supply wirelessly by means of a read/write device provided for the data carrier.

5. The security device according to claim 4, wherein the power supply is provided by at least one of optics and inductance.

6. The security device according to claim 1, wherein, by means of a laser in a read/write device provided for an optical data carrier, the data transmission takes place by at least one of optics and inductance.

7. The security device according to claim 1, wherein the data carrier is a rotary data carrier, the security device extending with the data carrier at a distance about an axis of rotation of the rotary data carrier.

8. The security device according to claim 1, wherein the electronics are mounted on the data carrier by a process of printing technology.

9. The security device according to claim 1, the security device further comprising an interactive component of software stored on a data carrier.

10. A process for the protection of data carriers against unauthorized copying comprising:
    recording data in a security device, wherein the security device is mounted on or in a data carrier and is a printed flexible polymer electronic circuit having printed electronic components and conductor tracks;
    processing the data by the security device; and
    reading an outcome of the processing from the security device.

11. The process according to claim 10, wherein at least one of recording data and reading an outcome of the processing is facilitated by a read/write device provided for the data carrier, in particular by means of a laser arrangement in optical data carriers.

12. The security device according to claim 1, wherein the printed flexible polymer electronic comprises organic semiconductor structures and conductor tracks.

\* \* \* \* \*